US008181854B1

(12) United States Patent
Folk et al.

(10) Patent No.: US 8,181,854 B1
(45) Date of Patent: May 22, 2012

(54) CASH HANDLING DEVICE HAVING INTEGRATED WIRELESS MODEM

(75) Inventors: Amy Baker Folk, Charlotte, NC (US); William Thomas Sanders, Denver, NC (US); Daniel Christopher Bohen, Charlotte, NC (US); Paul Martin Mattison, Sherrills Ford, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 249 days.

(21) Appl. No.: 12/183,521

(22) Filed: Jul. 31, 2008

(51) Int. Cl.
*G06Q 40/00* (2006.01)
*G07D 11/00* (2006.01)
*G07F 19/00* (2006.01)

(52) U.S. Cl. ........ 235/379; 235/375; 235/380; 235/383; 705/1.1; 705/14.64; 705/39; 705/43

(58) Field of Classification Search .................. 235/375, 235/379, 380, 383; 705/1.1, 14.64, 39, 43
See application file for complete search history.

(56) References Cited

U.S. PATENT DOCUMENTS

| | | | | |
|---|---|---|---|---|
| 5,053,607 A | * | 10/1991 | Carlson et al. | 705/18 |
| 5,903,881 A | * | 5/1999 | Schrader et al. | 705/42 |
| 5,991,410 A | * | 11/1999 | Albert et al. | 705/78 |
| 6,604,680 B2 | * | 8/2003 | Hamaguchi | 235/379 |
| 6,983,836 B2 | | 1/2006 | Adams et al. | |
| 7,025,256 B1 | * | 4/2006 | Drummond et al. | 235/379 |
| 7,230,223 B2 | | 6/2007 | Jespersen et al. | |
| 2001/0014881 A1 | | 8/2001 | Drummond | |
| 2002/0100660 A1 | | 8/2002 | Stieber | |
| 2003/0220994 A1 | * | 11/2003 | Zhu | 709/223 |
| 2004/0016796 A1 | | 1/2004 | Hanna | |
| 2004/0033832 A1 | | 2/2004 | Solomon | |
| 2004/0148254 A1 | | 7/2004 | Hauser | |
| 2004/0220859 A1 | | 11/2004 | McGunn | |
| 2004/0231956 A1 | | 11/2004 | Adams | |
| 2004/0267666 A1 | * | 12/2004 | Minami et al. | 705/43 |
| 2005/0121513 A1 | | 6/2005 | Drummond | |
| 2005/0187826 A1 | | 8/2005 | Wike | |
| 2006/0043167 A1 | | 3/2006 | Fujioka | |
| 2006/0089893 A1 | * | 4/2006 | Joseph et al. | 705/35 |
| 2006/0196926 A1 | * | 9/2006 | Benson et al. | 235/375 |
| 2006/0212372 A1 | | 9/2006 | Eberhardt | |
| 2006/0293783 A1 | | 12/2006 | Hand | |
| 2007/0100750 A1 | * | 5/2007 | Hartfield et al. | 705/43 |
| 2007/0181676 A1 | | 8/2007 | Mateen | |
| 2007/0187485 A1 | | 8/2007 | Aas | |
| 2007/0235520 A1 | | 10/2007 | Smith | |
| 2007/0235521 A1 | | 10/2007 | Mateen | |
| 2007/0235522 A1 | | 10/2007 | Mateen | |
| 2007/0235523 A1 | | 10/2007 | Clements | |
| 2007/0246525 A1 | | 10/2007 | Smith | |
| 2008/0005039 A1 | * | 1/2008 | Puthupparambil et al. | 705/72 |

* cited by examiner

*Primary Examiner* — Ali Sharifzada
(74) *Attorney, Agent, or Firm* — Banner & Witcoff, Ltd.; Michael A. Springs

(57) ABSTRACT

A cash recycler or other currency handling device includes an integrated wireless modem. The wireless modem may be located within a housing of the cash recycler. The wireless modem may connect to a network via a network service provider account held by a retail store or other venue at which the cash recycler is located. Additionally or alternatively, the wireless modem may connect via a network access account held by the financial institution with which the cash recycler is communicating. The wireless modem may include various settings that may be configured and adjusted via the user interface of the cash recycler.

21 Claims, 13 Drawing Sheets

CASH HANDLING DEVICE HAVING INTEGRATED WIRELESS MODEM

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, conventional cash recyclers are often limited to use in venues having hard wired network access and/or require businesses or other entities to configure their own network access and connections. This may require configuration of network addresses, using the appropriate network connections, purchasing of additional software or hardware and the like. Accordingly, providing a cash recycler that is a stand-alone type unit may make use of cash recyclers more accessible in various locations.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention relate to integrating a wireless modem into a cash recycler or other currency handling device. The wireless modem may be physically located within the housing of the cash recycler. In addition, the wireless modem may connect to a network, such as the internet, via an account with a network service provider. The account may be held by the retail store in which the cash recycler is being used. In other arrangements, the account may be held by the financial institution with which the cash recycler will be communicating.

In some arrangements, the wireless modem may connect to the network upon powering up the cash recycler. In some examples, the wireless network connection will be maintained until the connection is broken: either automatically (i.e., by removing power from the cash recycler) or manually by a user. In other arrangements, the wireless modem may connect upon initiation of a cash transaction at the cash recycler and may disconnect from the network when the transaction is complete. These wireless modem settings may be configured and adjusted via the user interface of the cash recycler.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
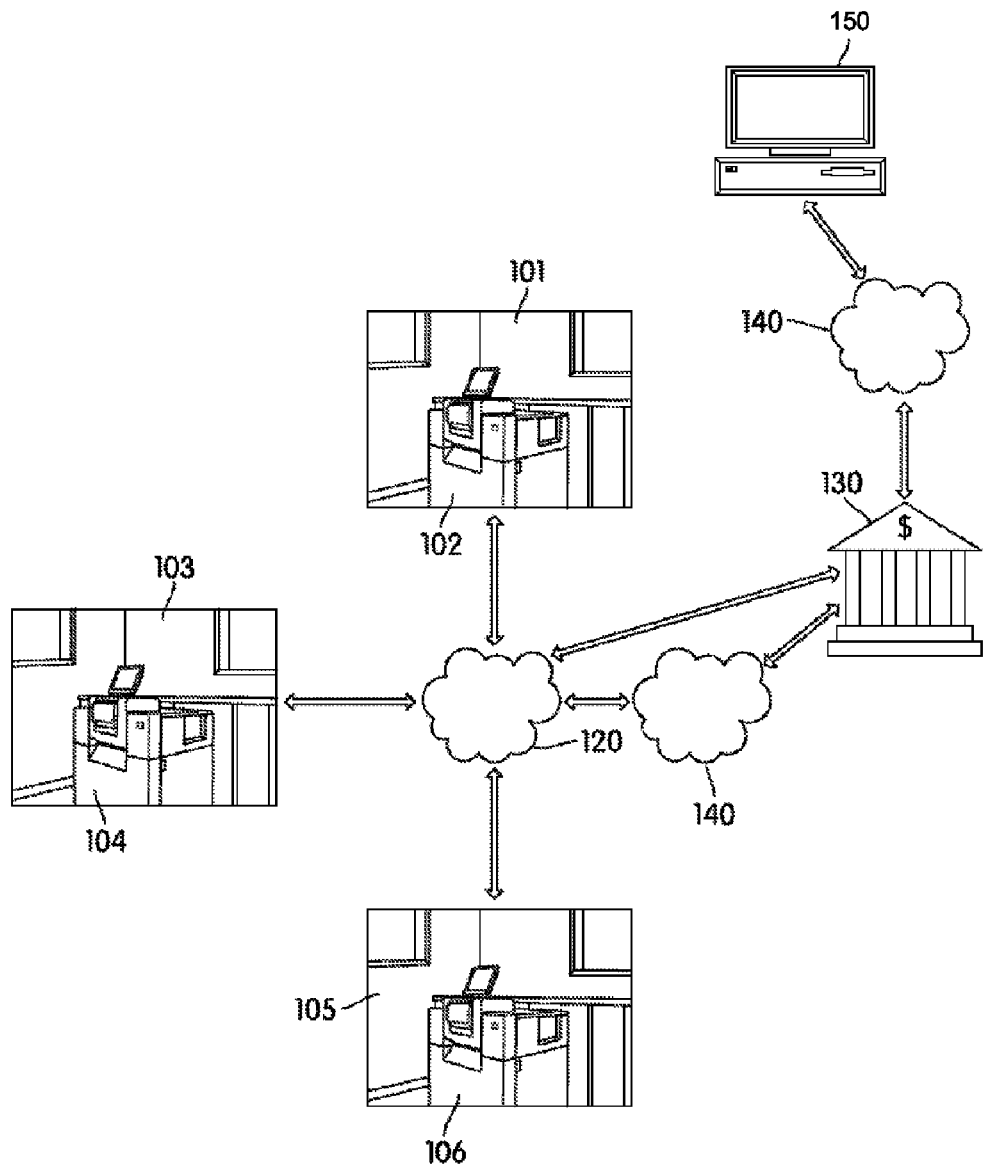
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
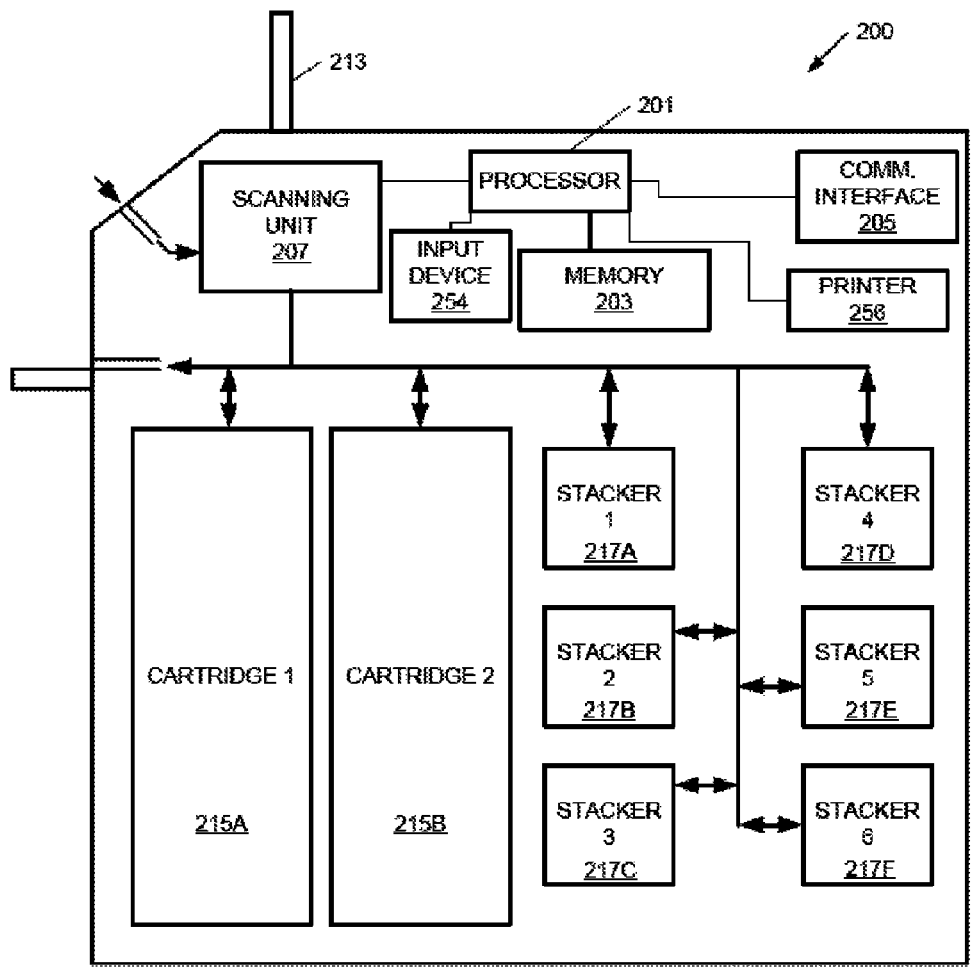
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203. In addition, scanning unit 207 may be configured to scan checks or other non-currency paper items, in addition to paper currency.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
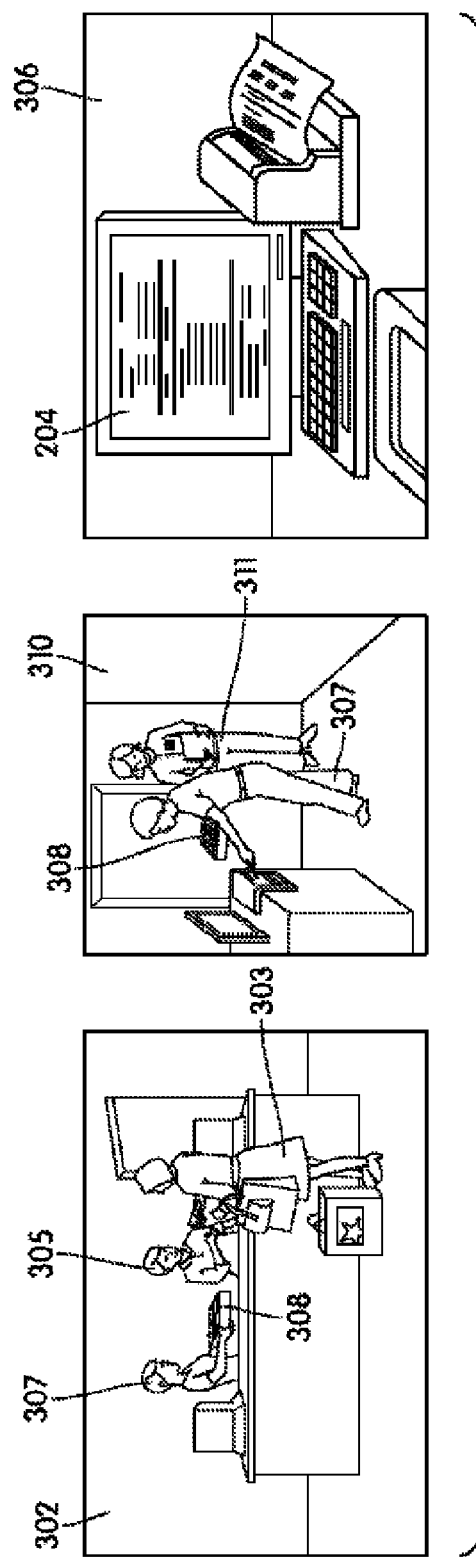
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
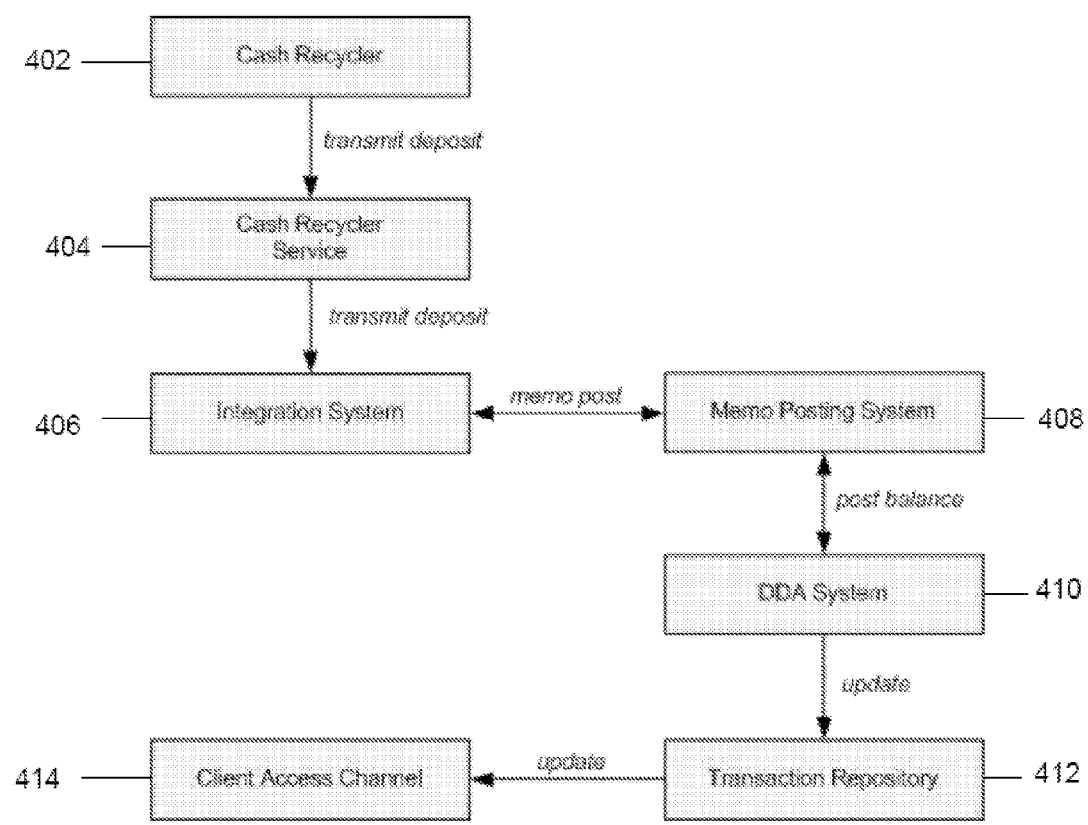
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
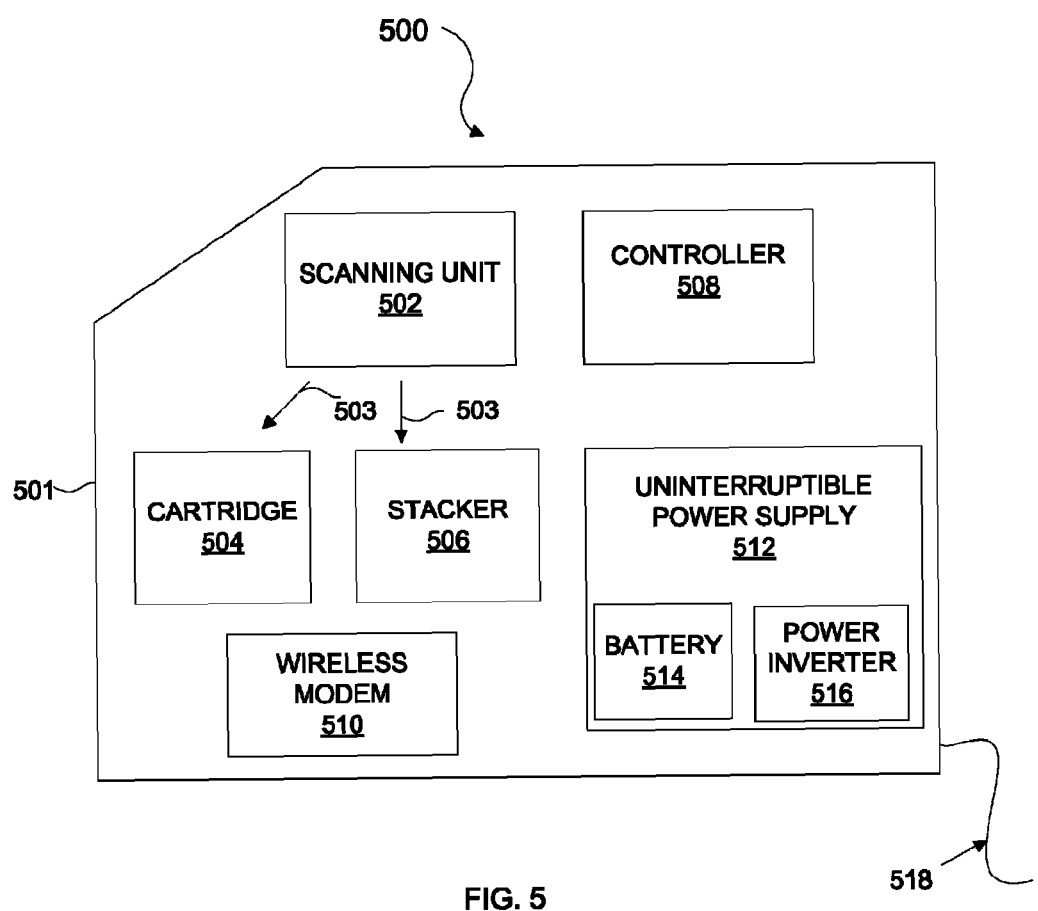
FIG. 5 is a simplified diagram of a currency recycler including various components in accordance with one or more aspects of the invention.

FIG. 5 illustrates one example cash recycler 500 having various integrated components to simplify performance of the cash recycler 500 and improve efficiency of the cash recycler 500.

Figure 6:
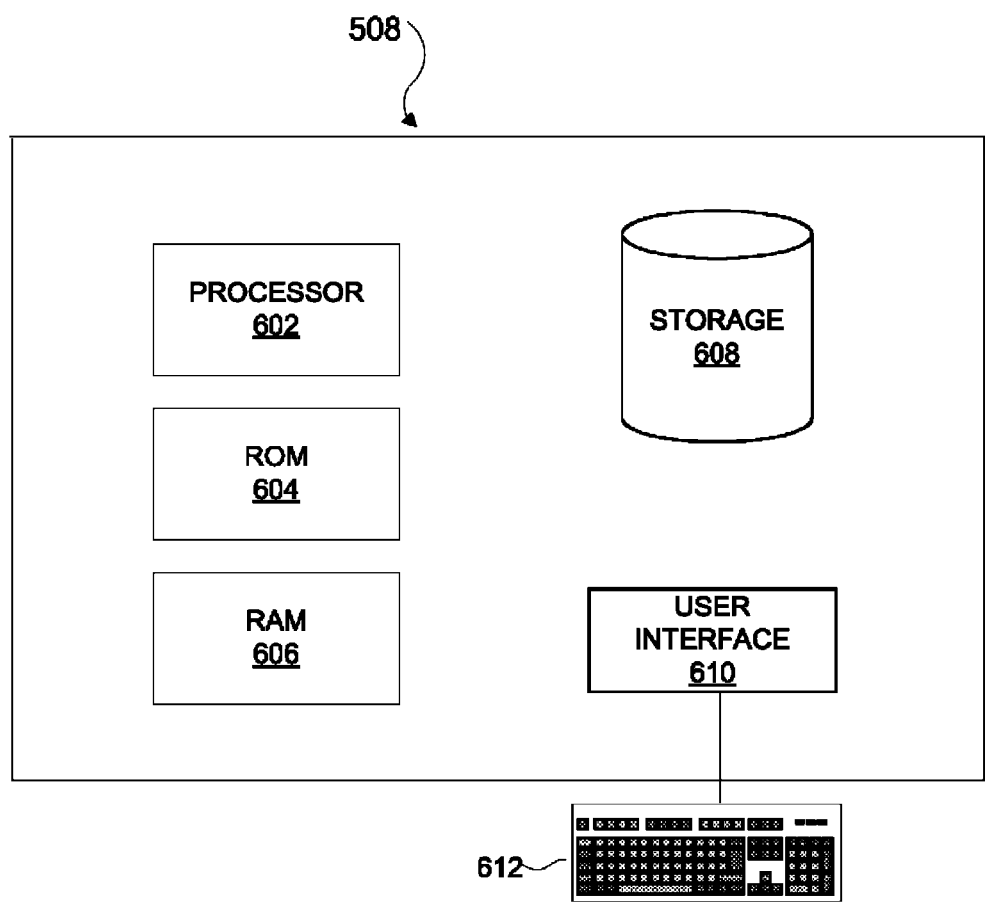
FIG. 6 is a simplified diagram of a controller integrated into the currency recycler of FIG. 5 in accordance with aspects of the invention.

With further reference to FIG. 5, the cash recycler 500 or other currency handling device described above may include an integrated controller 508. The cash recycler 500 may include some or all aspects of the cash recycler 200, as shown in FIG. 2. Thus, instead of having to use a separate control device such as a computer to control the operations of a cash recycler, the cash recycler 500 of FIG. 5 includes an integrated controller 508 configured to process transactions including transmit data to a financial institution for recognition at the financial institution, control mechanical systems of the cash recycler 500, control access to one or more portions of recycler 500, reconcile logical and physical counts and the like. As shown in FIGS. 5 and 6, the integrated controller 508 is physically located as part of a cash recycler housing 501 and generally includes a processor 602. Controller 508 may further include memory such as RAM 606 and ROM 604. In addition, the controller may include or have access to storage 608 and a user interface 610. The user interface 610 may include a display as well as various input devices such as a keyboard 612, mouse, etc. In some arrangements, the display may be a touch-sensitive display thereby allowing user input to be received through the display. Additionally or alternatively, the user interface may be configured to receive voice commands. The controller may further be configured to control various peripheral devices, such as a printer, external storage device, and the like using one or more adapters and interfaces (not shown).

The controller 508 is configured to execute software for providing functionality to the cash recycler 500. For instance, the controller 508 executes commands as directed by the software to control transactions made using the currency recycler 500, communicate with the financial institution or other entity, provide outputs via the user interface 610 or a peripheral device, such as a printer, and also to physically move the currency within the cash recycler 500.

For example, a user may deposit $1000 into the cash recycler 500. The user provides input through the user interface 610 regarding the deposit. This user input may include selection from a display, voice commands, and the like. The money is then deposited into the cash recycler 500. In one arrangement, the controller 508, in response to various instructions provided by the software, may control the mechanical systems of the cash recycler 500, as well as the electronic (e.g., computer) systems of the cash recycler 500. For instance, the controller 508 may operate the mechanical system that controls the flow of currency into the machine during a deposit. In another arrangement, the controller 508 may house the software configured to send and receive instructions to an additional driver or controller that controls the flow of currency. These mechanical systems are not shown in the figures but are indicated by arrows 503. In addition, the controller 508 controls the scanning device 502 to scan each bill inserted into the cash recycler 500 to confirm authenticity and to verify the condition of the bill. If a bill is deemed counterfeit it will be removed from circulation and stored in a separate region of the cash recycler 500. The controller 508 will engage various mechanical systems to store the bill in the separate region. If the bill is deemed too worn to be returned to circulation, the mechanical systems run by the controller 508 will remove the bill and place it in a separate region for storage. If the bill is deemed suitable to return to circulation it will remain with the bills in the recycler 500 that may be withdrawn from the recycler 500. Further, controller 508 may reconcile a deposit amount specified by a depositing user and a physical count of the currency actually deposited to insure accuracy and integrity. In addition, the controller 508 will store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

Conventional cash recyclers and other currency handling devices generally include an external controller for performing the various functions of the cash recycler or other cash handling device. However, integration of the controller into the cash recycler, that is, integrating the controller 508 physically within the housing 501 of cash recycler 500, may help conserve space needed to house the cash recycler 500 and associated systems run by the controller 508. In addition, electronic integration of the controller 508 into the cash recycler will aid in seamless operation between the software, controller 508 and mechanical systems of the cash recycler 500. For instance, the various systems of the cash recycler 500 may be designed to work together and operate via the integrated controller 508.

In some arrangements, the cash recycler 500 may be a hardened device. That is, the cash recycler 500, along with integrated controller 508, may be constructed in a secure manner such that cash recycler 500 and controller 508 might not be easily reconfigured. For example, a controller such as controller 508 may be integrated into cash recycler 500 using application specific circuits, dedicated hardware connections and components and the like that might not be easily disrupted or reconfigured. This may prevent intruders from hacking into the cash recycler system by, e.g., merely disconnecting an external controller. Further, having a hardened recycler 500 with an integrated controller 508 may eliminate some of the installation or configuration that might be required for installing external or separate controllers since controller 508 is already integrated (i.e., pre-configured and pre-connected) for use with recycler 500.

Additionally or alternatively, access to the various functions of the cash recycler 500 may be password protected or may require other authorization and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to hack into the controller 508 and bypass such security measures.

Figure 7:
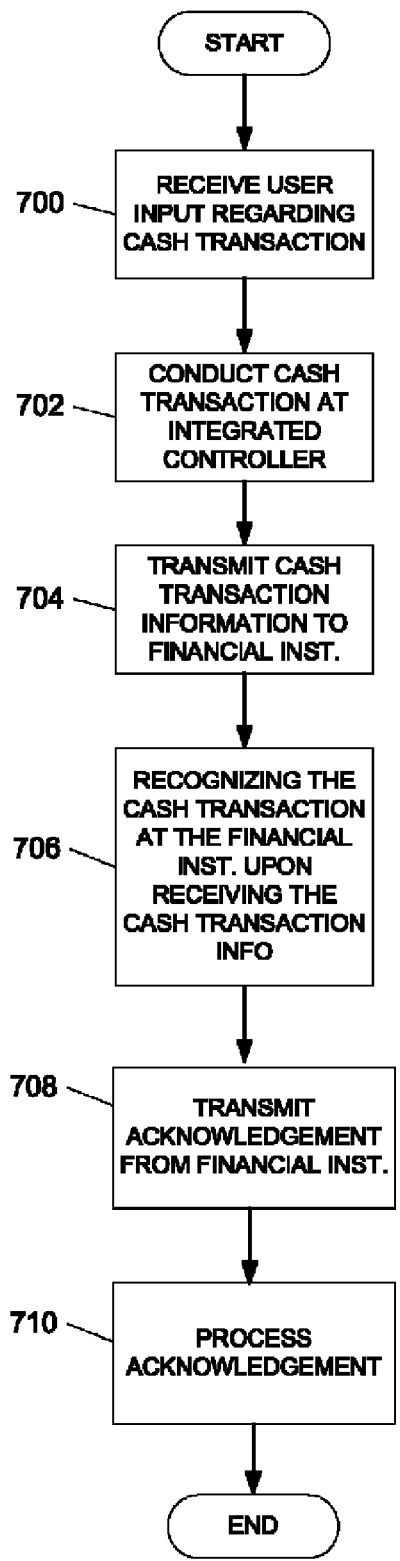
FIG. 7 illustrates a method for controlling various cash transactions performed at the cash recycler using the integrated controller in accordance with aspects of the invention.

FIG. 7 illustrates one example method of conducting a cash transaction using the integrated controller 508. In step 700, user input is received regarding a cash transaction. The user input is received via an integrated user input device (e.g., user interface 610 of FIG. 6). Step 700 may include logging in to the cash recycler and/or providing any preliminary information regarding the user and/or the transaction prior to conducting the transaction. In step 702 the cash transaction is processed. For example, upon the integrated controller receiving the user input, the controller may control one or more mechanical systems associated with receiving or dispensing cash associated with the transaction. When the cash transaction is complete, the controller transmits, to the financial institution, various cash transaction information, as shown in step 704. The cash transaction information may include information such as a user identification number, type of transaction, amount of money deposited or withdrawn, date and time of the transaction, cash handling device identification number, and the like. Upon receiving the cash transaction information, the financial institution will reconcile the cash transaction with the depositor's account. This arrangement allows for immediate or virtually immediate recognition of the cash transaction in the depositor's account, as shown in step 706. Once the cash transaction information is received and reconciled, an acknowledgement of the cash transaction is transmitted from the financial institution to the cash recycler in step 708. In step 710, the controller may process the acknowledgement. Processing the acknowledgement may include forwarding the acknowledgement as an email to one or more email accounts, forwarding the acknowledgement to a peripheral device, such as a printer, storing the acknowledgement, and the like.

Figure 8:
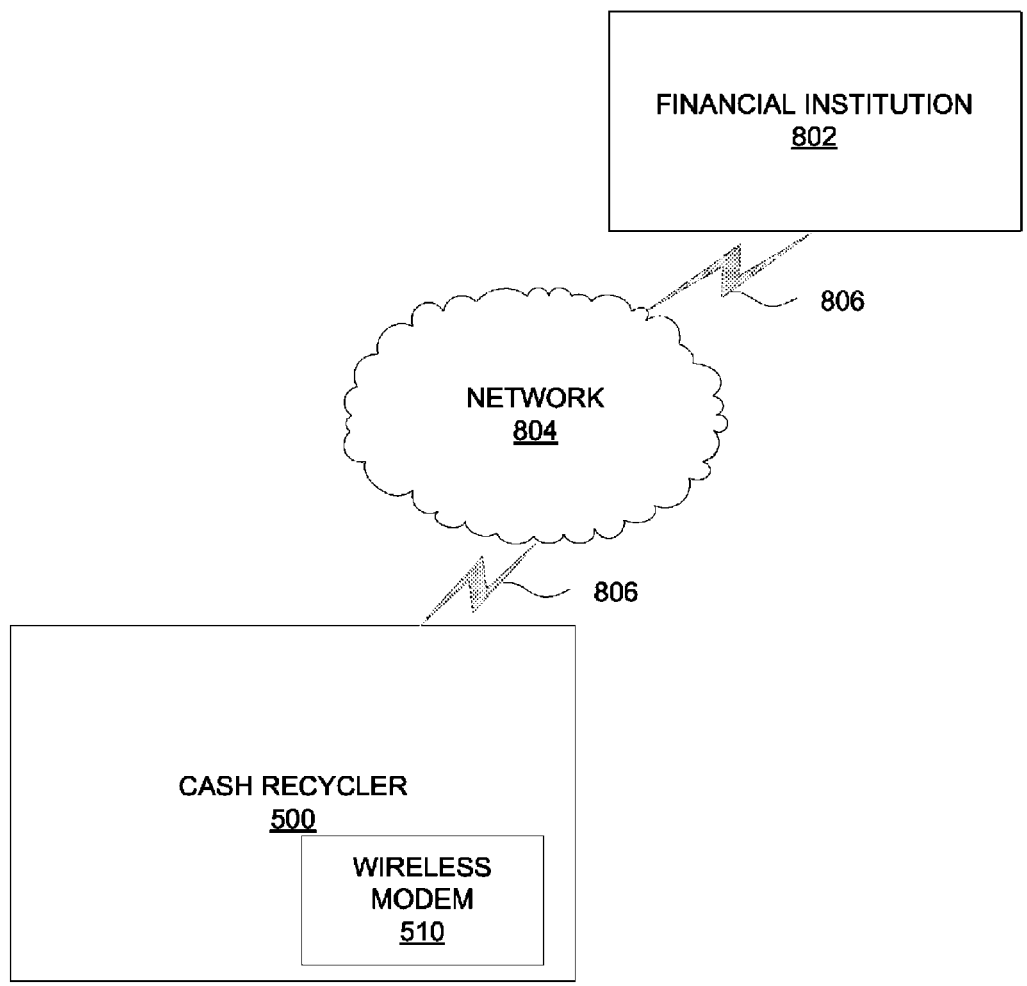
FIG. 8 illustrates a simplified diagram of a wireless modem integrated into the cash recycler of FIG. 5 in accordance with aspects of the invention.

With further reference to FIG. 5, the cash recycler 500 and/or other currency handling device described above may include a wireless modem 510 or router integrated into the cash recycler 500. As shown in FIG. 8, the integrated wireless modem 510 is configured to allow communication between the cash recycler 500 and the financial institution 802. In some arrangements, the integrated wireless modem 510 may permit communication between the cash recycler and other cash recyclers.

Conventional cash recyclers and currency handling devices generally communicate with a financial institution via a hard wired connection. This arrangement generally limits the use of the cash recycler to venues having an available hard-wired internet connection and generally prevents use of cash recyclers in venues having no internet access. In addition, the use of a hard-wired connection requires an account with an internet service provide to provide access to the internet via the hard-wired connection. Additionally, some entities restrict use of the hard-wired connections within their facilities to entities that are part of the corporate structure, thereby not allowing an outside entity (such as the cash recycler) to be connected to the available hard-wired connection. In one or more integrated wireless arrangements described herein provides a self-sufficient, stand-alone system that can be placed in any venue regardless of the internet capabilities available at the venue.

For instance, the cash recycler 500 may be placed in a retail store having no internet connectivity or having only hard-wired internet access at limited locations throughout the store. Use of the cash recycler 500 with integrated wireless modem 510 permits a user to place the cash recycler 500 at any location throughout the store and permits the cash recycler 500 to communicate with the financial institution without relying on the limited or non-existent hard-wired connections of the retail store. Additionally, the inclusion of a integrated wireless modem 510 may eliminate some or all of any installation or configuration requirements for the wireless model 510 to operate with recycler 500.

As shown in FIG. 8, the cash recycler 500 may communicate with the financial institution 802 via a network 804. Access to the network 804 is provided via a user account. In one arrangement, the cash recycler 500 may access the Internet through a wireless network service provider account established by the retail store or related entity. For instance, a retail store may have an account with Network Service Provider X. Once the cash recycler 500 is placed in the retail store, the cash recycler 500 may be configured to communicate with the financial institution 804 via a network connection (i.e., connections 806 in FIG. 8) established via the integrated wireless modem 510. Access to the network may be provided by the network service provider using the account of the retail store.

Additionally or alternatively, the cash recycler 500 may operate on wireless network service account provided by the financial institution 802. For instance, Bank X may have an account with Network Service Provider Y. The cash recycler 500 may then connect to the network 804 via the integrated wireless modem 510 using Bank X's account with Internet Service Provider Y. This reduces or eliminates the need for the retail store to have a separate or any wireless network access account in order to provide communication between the cash recycler 500 and the financial institution 802. Additionally, a financial institution 802 may pre-configure the cash recycler 500 and modem 510 to use the financial institution's network account, thereby eliminating a need for a retail store or other customer to configure network settings and the like. This arrangement provides a truly self-sufficient, stand-alone cash recycler system that may be placed in any venue and is able to communicate with the financial institution as needed.

In addition, the integrated wireless modem may provide ease of installation of the cash recycler 500 because no additional network connection capabilities are required. Rather, the installation may take place with nothing more than the cash recycler 500. In particular, no additional configuration, hardware, software or firmware would be required for the recycler 500 to establish a connection with the financial institution. This will aid in efficiency of installation and will reduce costs associate with labor, parts, etc.

In some arrangements, the integrated wireless modem 510 may remain connected to the network at all times. For instance, anytime the cash recycler 500 is receiving power to operate, the integrated wireless modem 510 will automatically connect to the network and will remain connected until power is shut off from the cash recycler 500 or until a user disconnects the network connection. In other arrangements, the wireless modem 510 may be connected in an on-demand type arrangement.

Figure 9:
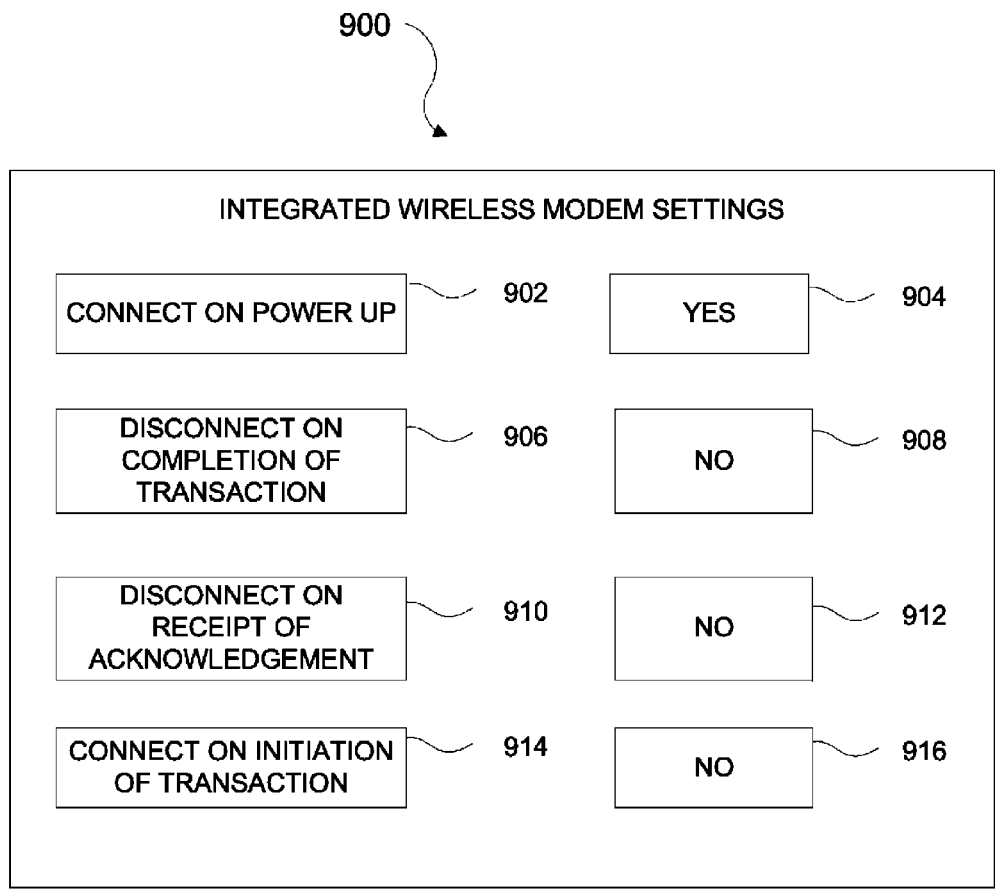
FIG. 9 is an example user interface for configuring various aspects and functions of the integrated wireless modem in accordance with aspects of the invention.

FIG. 9 illustrates various configuration options for the wireless modem 510 that may be used. Access to the wireless modem settings is provided via a user interface such as a touch-sensitive display. For example, FIG. 9 illustrates one example user interface 900 through which various wireless modem settings that may be adjusted. Setting 910 provides for the wireless modem 510 to automatically connect to the network once power is provided to the cash recycler 500. In the arrangement of FIG. 9, this function is activated as indicated by the "YES" shown in setting region 904. The user may change or adjust this setting, and any of the settings shown, by double clicking in the setting region (i.e., 910) and inserting the new value or setting. Additionally or alternatively, the user may select a radio button associated with the desired setting (not shown) for each function. In still other arrangements, the user may select the appropriate setting from a drop down menu of selections.

In addition, the wireless modem may be configured to disconnect based on various events. For instance, the wireless modem 510 may disconnect on completion of each transaction 906. In the arrangement of FIG. 9, this function is deactivated, as shown by the "NO" in setting region 908. The wireless modem 510 may also be configured to disconnect upon receipt of an acknowledgement 910 from the financial institution that a transaction has been reconciled with the financial institution. This feature is shown as deactivated in setting region 912 of FIG. 9. The wireless modem 510 may also be configured to connect to the network upon initiation of a transaction 914 at the cash recycler 500. The wireless modem 510 may then disconnect upon completion of the transaction. As shown in FIG. 9, this feature is also deactivated in setting region 916. Further, the wireless modem 510 may connect and disconnect at regular, predetermined intervals. A user may adjust the wireless modem settings as needed to maximize efficient performance of the cash recycler 500 with integrated wireless modem 510.

Figure 10:
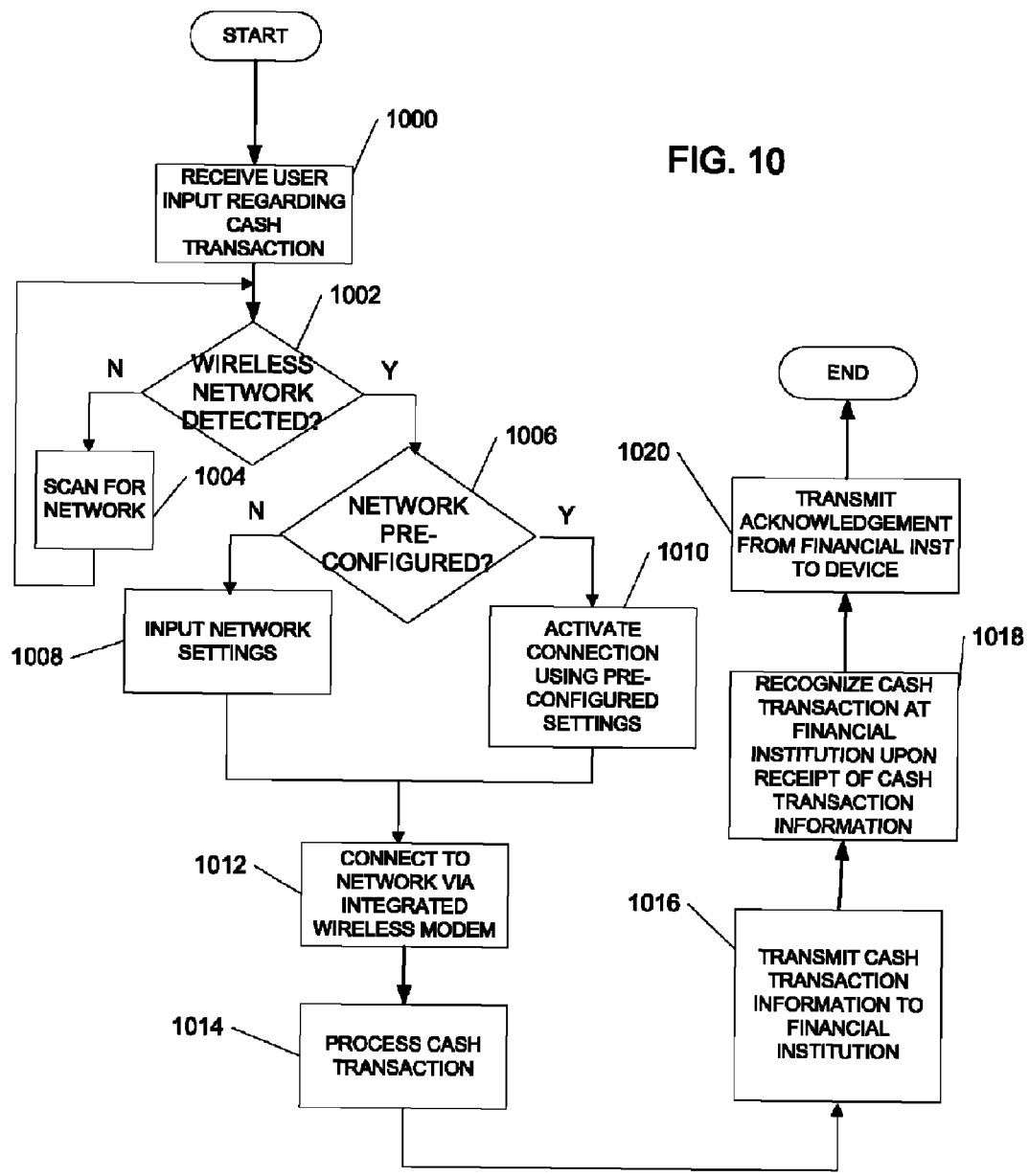
FIG. 10 illustrates a method for transmitting cash transaction information from the cash recycler to a financial institution via the integrated wireless modem in accordance with aspects of the invention.

FIG. 10 illustrates one example method of conducting a cash transaction at a cash recycler including the integrated wireless modem. In step 1000, user input is received regarding the cash transaction. User input may be received via the user interface. In step 1002, a start-up process is performed. The start-up process can include, detecting a wireless connection. If a wireless network connection is not detected, the cash recycler may perform a scan to identify any available wireless connections, as in step 1004. The scan may continue until a wireless network is identified or until a predetermined time threshold has been reached, etc. Additionally or alternatively, if no wireless connection is found, the cash handling device may enter a store and forward mode as described in U.S. patent application Ser. No. 12/183,706, entitled "Transaction Storing and Forwarding," filed on Jul. 31, 2008. If a wireless network is detected, in step 1006 the configuration of the wireless network is determined. If the wireless network is pre-configured, the network connection may be activated using the pre-configured settings, as in step 1010. If the network is not pre-configured, the user may input desired network settings in step 1008.

In step 1012 a connection is made between the integrated wireless modem of the cash recycler and the network. This connection provides for communication between the cash recycler and the financial institution. In step 1014, the cash transaction is processed. In step 1016 cash transaction information is transmitted from the cash recycler to the financial institution via the network connection established by the integrated wireless modem. The cash transaction information may include a user identification number, type of transaction, amount of deposit or withdrawal, date and time of transaction, cash handling device identification number, and the like. In step 1018 the cash transaction information is received at the financial institution and the cash transaction is reconciled with the account of the user. Once the transaction is reconciled, the transaction is immediately or virtually immediately recognized in the account at the financial institution. In step 1020 an acknowledgement of recognition of the transaction is transmitted from the financial institution to the cash recycler.

As discussed above, the cash recycler 500 described herein may be a hardened device. By integrating the wireless modem into the cash recycler, the wireless modem is afforded additional protection against tampering and hacking by would-be intruders.

With further reference to FIG. 5, currency recyclers 500 and/or other cash handling devices as described above may include an integrated uninterruptible power supply (UPS) 512. The cash recycler 500 of FIG. 5 may include one or more aspects of cash recyclers described herein and may be similar to the cash recycler 200 shown in FIG. 2.

Generally, an UPS 512 is provided to maintain power to the cash recycler 500 in the event that the primary power supply is disrupted, such as due to a power outage, etc. Uninterruptible power supplies are generally known in the art. The UPS 512 is configured to maintain power to the cash recycler 500 without interruption. For instance, if the cash recycler 500 is receiving power from a primary or first power supply 518, i.e., a wall outlet, and the power signal is interrupted due to, for instance, a weather related power outage, the power will transition from the primary power source 518 to the integrated UPS 512 without interruption, thereby providing a continuous supply of power and protecting the cash recycler 500 from damage associated with power outages including, business interruption, loss of data, and the like. Power outages or breaks in the continuous supply of power may be caused by several occurrences, including power failures or outages, voltage surges, voltage spikes, voltage sags, frequency differences, and the like.

The cash recycler 500 described herein may be used with various types of uninterruptible power supplies 512, such as continuous uninterruptible power supplies or standby uninterruptible power supplies. Both types include a battery 514. However, continuous or standby UPS devices function in slightly different ways. For instance, an integrated standby UPS may permit the cash recycler 500 to utilize power from the primary power source 518 until a problem is detected. Once the problem is detected, a power inverter 516 may be engaged to permit the cash recycler 500 to be powered by the UPS 512. The power inverter 516 generally converts the direct current power provided by the battery 514 of the UPS 512 to alternating current power as used by the cash recycler 500. The transition from the primary power source 518 to the UPS 512 once the problem is detected may occur very quickly and, in some instances, in less than 5 milliseconds. This quick transition will maintain power to the cash recycler 500.

The continuous UPS may provided a continuous stream of power to eliminate the gap between primary power and UPS power found with the standby UPS. For instance, a continuous UPS provides power to the cash recycler 500 through the battery 514 of the UPS 512 on a consistent basis. That is, the power inverter 516 is constantly converting the direct current power of the battery 514 to alternating current power to run the cash recycler 500. In addition, the battery 514 is constantly being charged by the primary power source 518. Accordingly, a continuous UPS provides a very stable source of power for a cash recycler 500 or other cash handling device.

The cash recyclers 500 described herein may be used with either a standby UPS or a continuous UPS 512. Both types of UPS's provide protection from business disruption, loss of data, etc. due to various power variations. For instance, ensuring a stable flow of power aids in maintaining the functionality of the cash recycler 500 to deposit and withdraw currency and to have those transactions recognized almost immediately at the financial institution to whom those transactions are transmitted.

The uninterruptible power supplies 512 described herein are integrated into a cash recycler 500 or other cash handling device. For instance, as shown in FIG. 5, the cash recycler 500 includes an UPS 512 that is physically located within the housing 501 of the cash recycler 500. This arrangement provides a financial advantage because the costs associated with providing an external UPS are eliminated. In addition, the arrangement reduces the space required to house the cash recycler 500 and UPS 512 because no additional space is needed to house the UPS 512. In addition, integrating the UPS 512 will ensure smooth transitions between the operating systems of the cash recycler 500 and the UPS 512. Further, locating the UPS 512 within the cash recycler 500 provides an additional level of security because the cash recycler 500 is a hardened device and allows limited access to the internal portion of the cash recycler 500 and limited ability to modify the software, hardware or firmware of the cash recycler 500. This permits personnel with the appropriate security level to access and/or adjust the UPS 512 and various other internal portions of the cash recycler 500.

Figure 11:
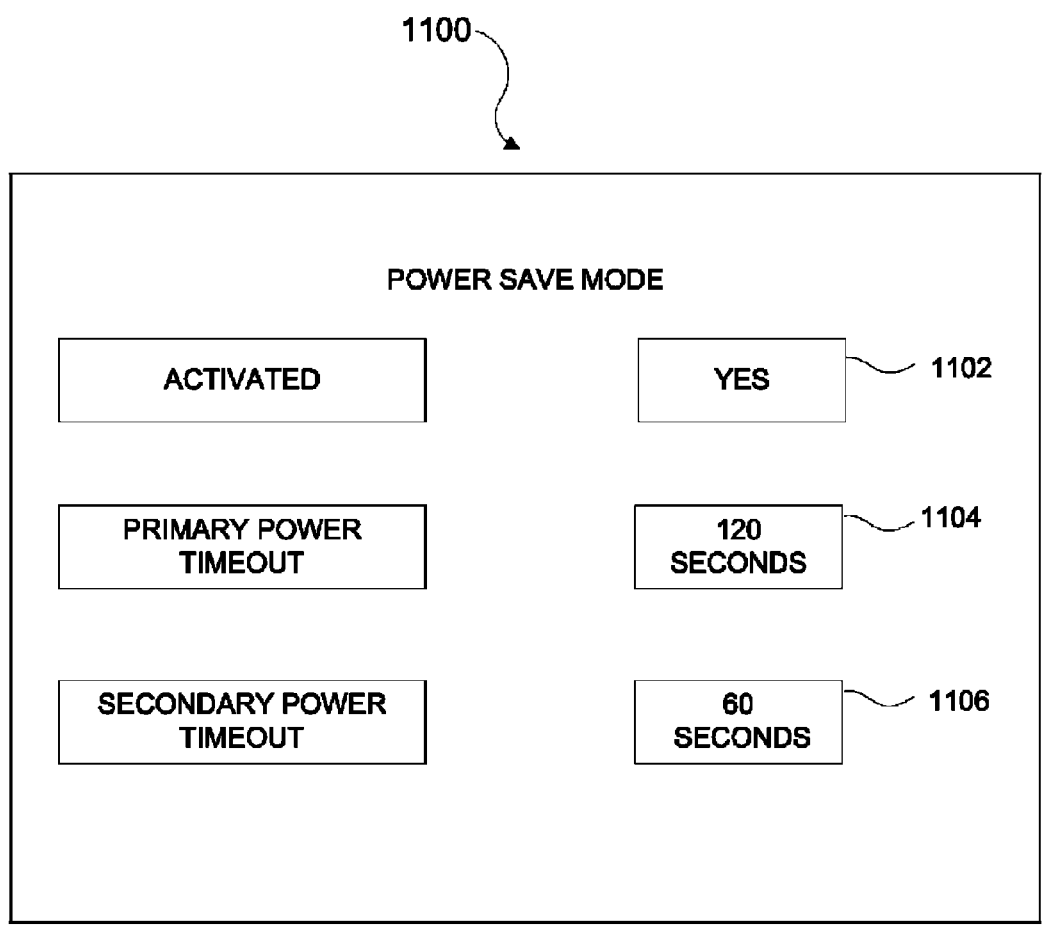
FIG. 11 is an example user interface for configuring aspects of an integrated uninterruptible power supply in accordance with aspects of the invention.

The user interface of the cash recycler 500, enables the user to adjust various power settings in order to conserve power used by the recycler 500. In some arrangements, the settings may be adjusted based on whether the cash recycler 500 is running on primary power or on power supplied by the integrated UPS 512. For instance, FIG. 11 illustrates one example user interface 1100 for configuring various power save settings. In region 1102, a user may activate a power save mode to conserve power. When power save mode is engaged, the user interface of the cash recycler 500 may not be visible to the user and various systems of the cash recycler 500 may enter a sleep mode. In one arrangement, the cash recycler 500 may engage in power save mode after a predetermined period of inactivity. In some examples, the predetermined time after which the cash recycler 500 will enter power save mode is based on the power source for the cash recycler 500. For instance, the cash recycler 500 may engage in power save mode after a first predetermined time when powered by the primary power source 518 and after a second predetermined time when powered by the integrated UPS 512. For example, as shown in FIG. 11, when the cash recycler 500 is powered by the primary power source 518, the recycler 500 may engage in power save mode after a first predetermined time of inactivity, such as 120 seconds shown in field 1104, while the cash recycler may enter power save mode after only 60 seconds, as shown in field 1106, when powered by the integrated UPS 512. In another example, the cash recycler 500 may engage in power save mode after 30 seconds of inactivity. The predetermined times listed are merely example time periods. In some arrangements, the user may adjust the predetermined time to be any desired time for engaging in power save mode.

Figure 12:
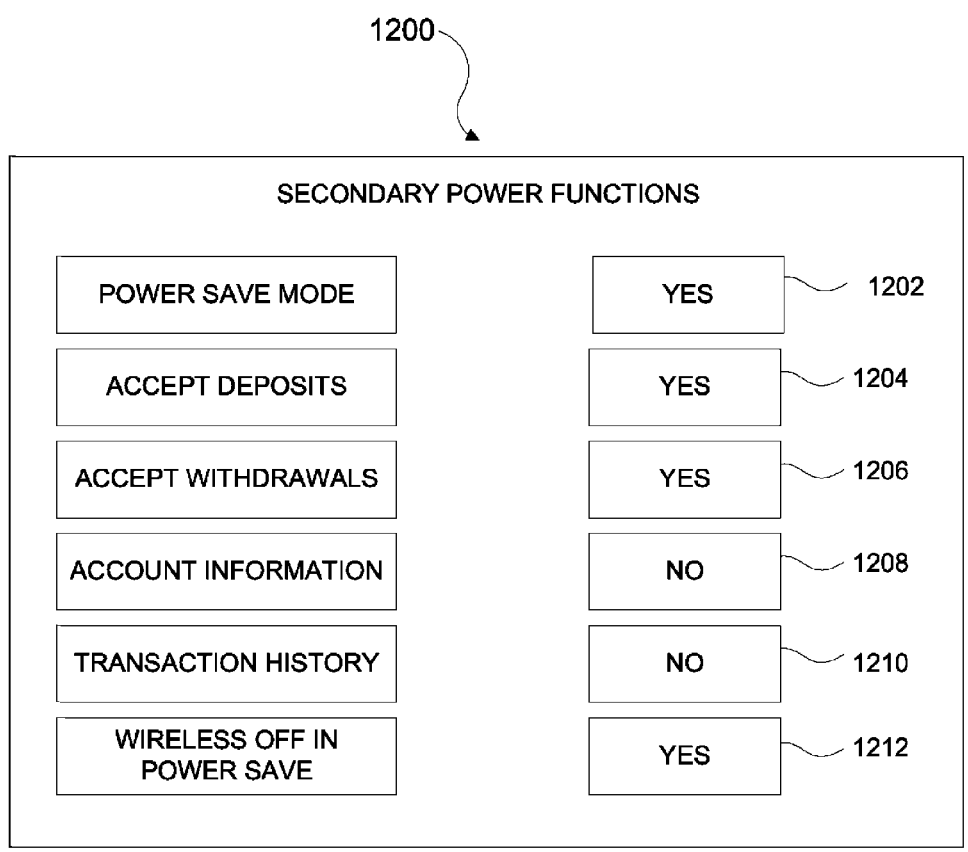
FIG. 12 is an example user interface for configuring additional aspects of the integrated power supply and cash recycler in accordance with aspects of the invention.

FIG. 12 illustrates an example user interface 1200 that will permit a user to adjust the functionality of the cash recycler 500 when the recycler 500 is powered by the integrated UPS 512. For instance, in order to conserve power, the cash recycler 500 may be set to provide limited functionality when the cash recycler 500 is powered by the integrated UPS 512. As shown in FIG. 12, various functional aspects of the cash recycler can be adjusted to aid in conserving power. For instance, power save mode may be activated, as shown in region 1202. That is, the cash recycler 500 may go into a low-power consumption or sleep type mode when power save mode is activated, as discussed above. In addition, the basic functions of the cash recycler 500 may be limited. For instance, the user can select the cash recycler 500 to accept deposits when on secondary power but not permit withdrawals. Regions 1204 and 1206 indicate various settings for accepting deposits and withdrawals when the cash recycler 500 is powered by the integrated UPS 512. Limiting the functionality of the cash recycler 500 when running on secondary power will aid in reducing the number of transactions performed at the cash recycler 500, thereby saving power. Additionally or alternatively, other functional aspects of the cash recycler 500 may be suspended when the cash recycler 500 is powered by the integrated UPS 512. For instance, the capability to provide general account information, as shown in region 1208, or transaction history, as shown in region 1210, may be suspended when the cash recycler 500 is powered by the integrated UPS 512.

In still another example shown in FIG. 12, a wireless connection of the cash recycler 500 may be disconnected at various times to conserve power, as shown in region 1212. For instance, the wireless connection may automatically disconnect when the cash recycler 500 enters power save mode and may automatically reconnect with the wireless network when power save mode is terminated. Reducing the draw of power associated with maintaining the wireless connection will aid in conserving power as the cash recycler 500 is powered by the integrated UPS 512.

Figure 13:
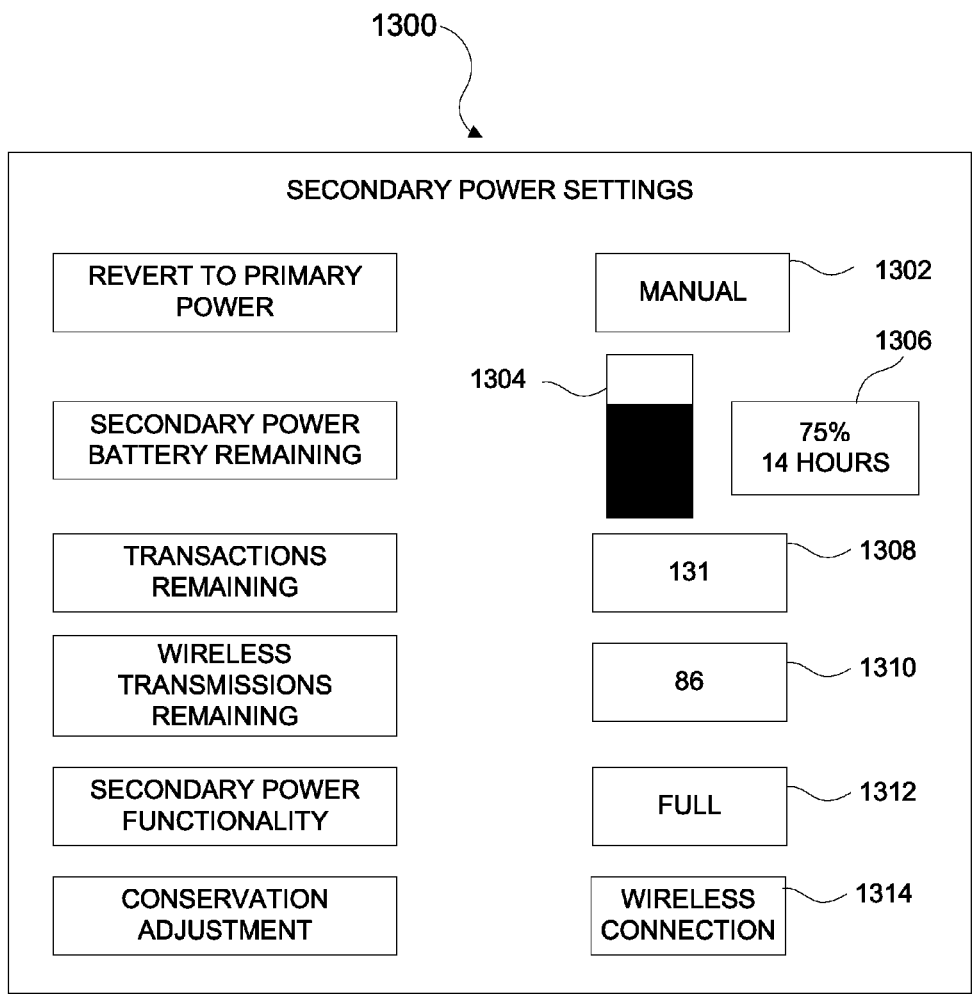
FIG. 13 is an example user interface for configuring still other aspects of the integrated power supply and cash recycler in accordance with aspects of the invention.

FIG. 13 illustrates additional functionality associated with the cash recycler 500 and integrated UPS 512 described above. In some arrangements, the cash recycler 500 may be set to automatically revert to the primary power source when the primary power source becomes available. For instance, during a power outage, the cash recycler 500 will be powered by the integrated UPS until the power outage ends. Once power is restored, the cash recycler 500 will automatically be powered by the primary power source. In other arrangements, the cash recycler 500 may have a manual power source setting. That is, the user may set the cash recycler 500 to remain powered by the integrated UPS 512 until the user manually inputs an instruction to power the cash recycler 500 with the primary power source 518. Selection of manual or automatic return to primary power may be selected from a power settings user interface, such as user interface 1300, and is shown in region 1302. Such an arrangement may be used when weather or other environmental conditions indicate that additional power outages may be forthcoming.

Additionally or alternatively, the user may view the power levels remaining in the battery of the integrated UPS 512, such as shown in region 1304 and 1306 of FIG. 13. The power remaining may be represented as percentage of battery life left, watts, hours, minutes, etc. Region 1304 provides a visual indication of the portion of battery life remaining. In addition, some arrangements may include a number of transactions that may be conducted before the power is drained, such as shown in region 1308. Additionally or alternatively, the user interface 1300 may indicate the number of transmissions from the cash recycler to the financial institution that may be made before the power is drained, such as shown in region 1310. In still other arrangements, an indication of the power remaining may include an indication of functions of the recycler 500 that may be de-activated to lengthen the life of the UPS 512. For instance, the recycler 500 may provide full functionality when powered by the integrated UPS 512, as shown in region 1312. However, as the battery of the UPS decreases, the user interface 1300 may provide an indication that disconnecting one or more features, such as the wireless network access as indicated in region 1314, during power save mode will lengthen the life of the battery of the UPS. The user may then adjust the wireless settings through the user interface, such as shown in FIG. 12, to aid in conserving power.

The example user interfaces shown in FIGS. 11-13 are merely examples. Any suitable user interface arrangement may be used to offer similar functionality. In addition, the settings shown may be adjusted by clicking or double clicking in the desired area. Additionally or alternatively, the desired setting may be chosen from a drop down menu that appears when an area is selected. In still other arrangements, all options may be visible to the user on the user interface and the user may select the desired setting by selection of a radio button or other selection indicator. In still other arrangements, the unit may be configured to receive and recognize voice commands.

The integrated components described above may be used with cash recyclers or with other cash handling devices. In addition, a cash recycler may include one or more of the integrated controller, wireless modem and UPS. For instance, a cash recycler may include an integrated controller and integrated wireless modem but may not include an integrated UPS. In another arrangement, a cash recycler may include an integrated UPS and integrated wireless modem but no integrated controller. Each of the integrated components may be used alone with a cash recycler or may be used in combination with any of the other integrated components described herein while maintaining the functionality of all aspects of the integrated component and the cash recycler, in general.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

What is claimed is:
1. A cash recycler, comprising:
   a housing;
   an integrated wireless modem located within the housing, the integrated wireless modem being pre-configured based on at least one component specific to the cash recycler, wherein the integrated wireless modem is configured to automatically connect to a network via a network access account of a financial institution with which the cash recycler is communicating upon initiation of a cash transaction and wherein the cash recycler is configured to receive cash, including at least one currency note, and dispense cash, including the received at least one currency note; and
   a user interface.
2. The cash recycler of claim 1, wherein the integrated wireless modem includes integrated wireless modem function characteristics configurable via the user interface.
3. The cash recycler of claim 1, wherein the cash recycler is a hardened device.
4. A method, comprising:
   initiating a transaction at a cash recycler including receiving currency in the cash recycler configured to receive cash, including at least one currency note, and dispense cash, including the received at least one currency note;
   determining an amount of currency received in the cash recycler in the initiated transaction;
   upon initiating the transaction, automatically connecting to a network via an integrated wireless modem within a housing of the cash recycler;

transmitting, via the network, data representative of the amount of currency received in the cash recycler to a financial institution; and upon receiving the data representative of the amount of currency transmitted, providing recognition of the amount of currency received in an account at the financial institution.

5. The method of claim 4, wherein the network connection is maintained, via the integrated wireless modem, when the cash recycler is receiving power.

6. The method of claim 4, further including automatically disconnecting from the network upon receiving recognition of the currency received.

7. The method of claim 6, wherein the step of connecting to the network is performed during each transaction.

8. The method of claim 4, wherein the step of connecting to the network via the integrated wireless modem is performed via a network access account of the financial institution.

9. A method of conducting cash transactions in a cash recycler, comprising:

receiving user input at a user interface of the cash recycler including instructions for initiating the cash transaction, the cash recycler being configured to receive cash, including at least one currency note, and dispense cash, including the received at least one currency note;

upon receiving instructions for initiating the cash transaction, automatically connecting to a network via an integrated wireless modem;

processing the cash transaction at the cash recycler;

transmitting cash transaction information, via the network, to a financial institution; and recognizing the cash transaction at the financial institution upon receipt of the cash transaction information.

10. The method of claim 9, wherein the step of connecting to the network via the integrated wireless modem is performed using a network access account of the financial institution.

11. The method of claim 9, wherein the wireless modem is located within the cash recycler.

12. The method of claim 9, further including transmitting, via the network, an acknowledgement of the cash transaction.

13. The method of claim 12, further including automatically disconnecting from the network upon receiving the acknowledgement of the cash transaction.

14. One or more non-transitory computer-readable media storing computer readable instructions that, when executed by a processor, cause the processor to:

receive user input at a user interface of a cash recycler instructions for initiating the cash transaction, the cash recycler being configured to receive cash, including at least one currency note, and dispense cash, including the received at least one currency note;

upon receiving instructions for initiating the cash transaction, automatically connect to a network via an integrated wireless modem;

process the cash transaction at the cash recycler;

transmit cash transaction information, via the network, to a financial institution; and recognize the cash transaction at the financial institution upon receipt of the cash transaction information.

15. The one or more computer-readable media of claim 14, wherein the step of connecting to the network via the integrated wireless modem is performed using a network access account of the financial institution.

16. The one or more computer-readable media of claim 14, wherein the wireless modem is located within the cash recycler.

17. The one or more computer-readable media of claim 14, further including transmitting, via the network, an acknowledgement of the cash transaction.

18. The one or more computer-readable media of claim 17, further including disconnecting from the network upon receiving the acknowledgement of the cash transaction.

19. The method of claim 4, further including disconnecting from the network upon completion of the initiated transaction.

20. The cash recycler of claim 1, wherein the integrated wireless modem is configured to disconnect from the network upon completion of a cash transaction.

21. The cash recycler of claim 1, wherein the integrated wireless modem is configured to automatically disconnect from the network upon completion of the cash transaction.

* * * * *